United States Patent [19]

Reichman et al.

[11] 4,403,667
[45] Sep. 13, 1983

[54] CABLE FOLLOWING APPARATUS UTILIZING A RELEASABLE CABLE GRIPPING MECHANISM

[75] Inventors: James M. Reichman, Issaquah; Douglas P. Kelley, Redmond, both of Wash.

[73] Assignee: Electric Power Research Institute, Inc., Palo Alto, Calif.

[21] Appl. No.: 289,211

[22] Filed: Aug. 3, 1981

[51] Int. Cl.³ ............................................ E21B 19/08
[52] U.S. Cl. ..................................... 175/230; 175/53; 175/67; 175/94; 175/422; 405/184; 254/134.6
[58] Field of Search ...................... 175/230, 53, 67, 94, 175/422; 405/184, 161, 163; 254/134.5, 134.6; 166/54.5, 54.6; 104/138 G, 202

[56] References Cited

U.S. PATENT DOCUMENTS

| | | | |
|---|---|---|---|
| 450,206 | 4/1891 | Wessel | 254/134.6 |
| 2,518,330 | 8/1950 | Jasper et al. | 254/134.5 |
| 3,462,124 | 8/1969 | Fischer | 254/134.6 |
| 3,827,512 | 8/1974 | Edmond | 175/230 X |
| 4,319,648 | 3/1982 | Cherrington | 175/53 |

Primary Examiner—Ernest R. Purser
Assistant Examiner—Thuy M. Bui
Attorney, Agent, or Firm—Flehr, Hohbach, Test, Albritton & Herbert

[57] ABSTRACT

A cable following apparatus especially suitable for use in replacing existing underground cable by reaming around and along the length of the cable is disclosed herein. This apparatus includes a main body or cable follower which is interconnected with the cable to be replaced for slidable movement along the latter. In order to accomplish this, the apparatus includes a specifically designed mechanism for releasably gripping the cable at least at one end preferably two points along the cable in a specifically controlled fashion. At the same time, the apparatus provide means for reaming around the cable, preferably by means of one or more floor jets. Once the soil surrounding the cable has been loosened using this apparatus, the cable can be easily pulled out of the ground. A replacement cable can be attached to the existing cable and therefore pulled into place.

13 Claims, 13 Drawing Figures

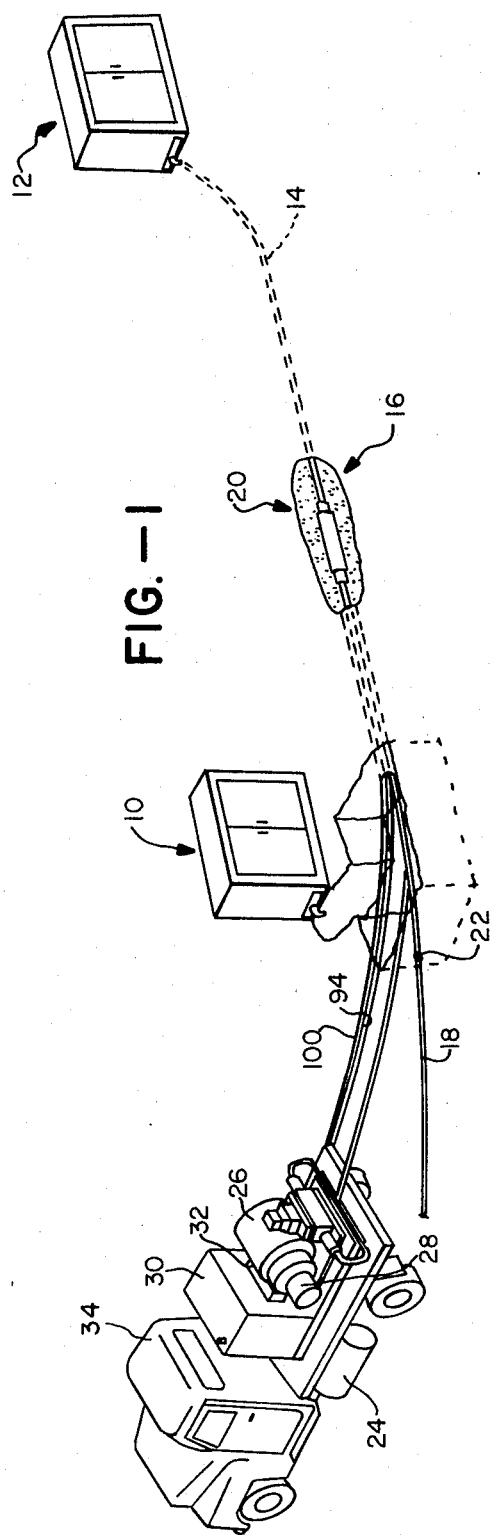
FIG.—1
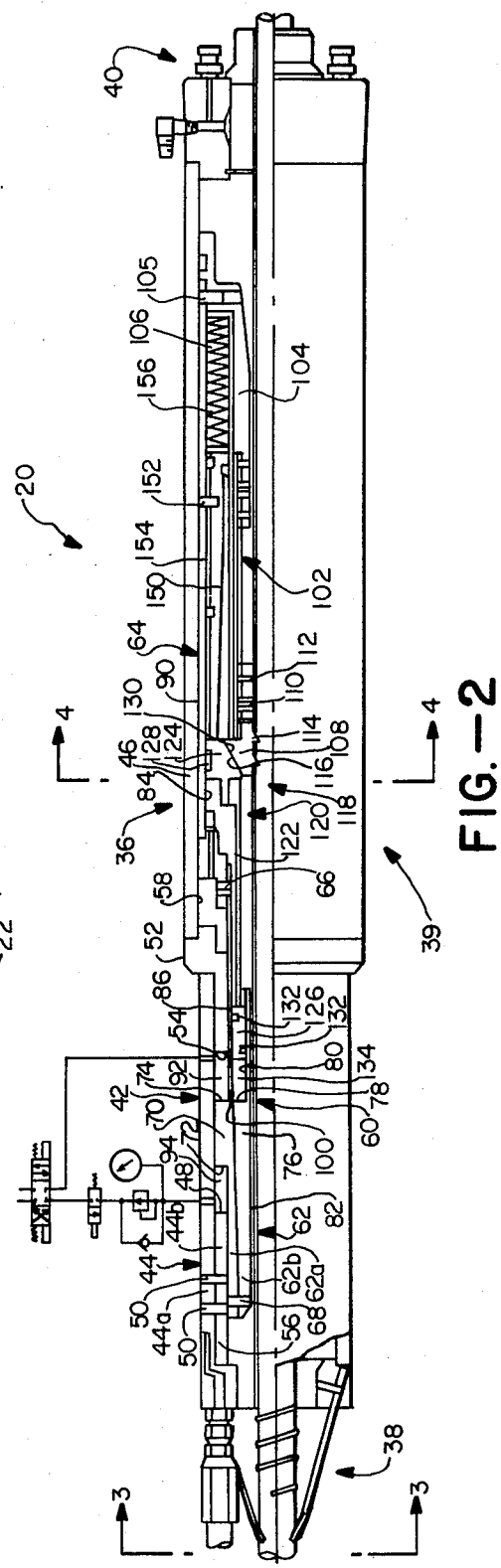
FIG.—2

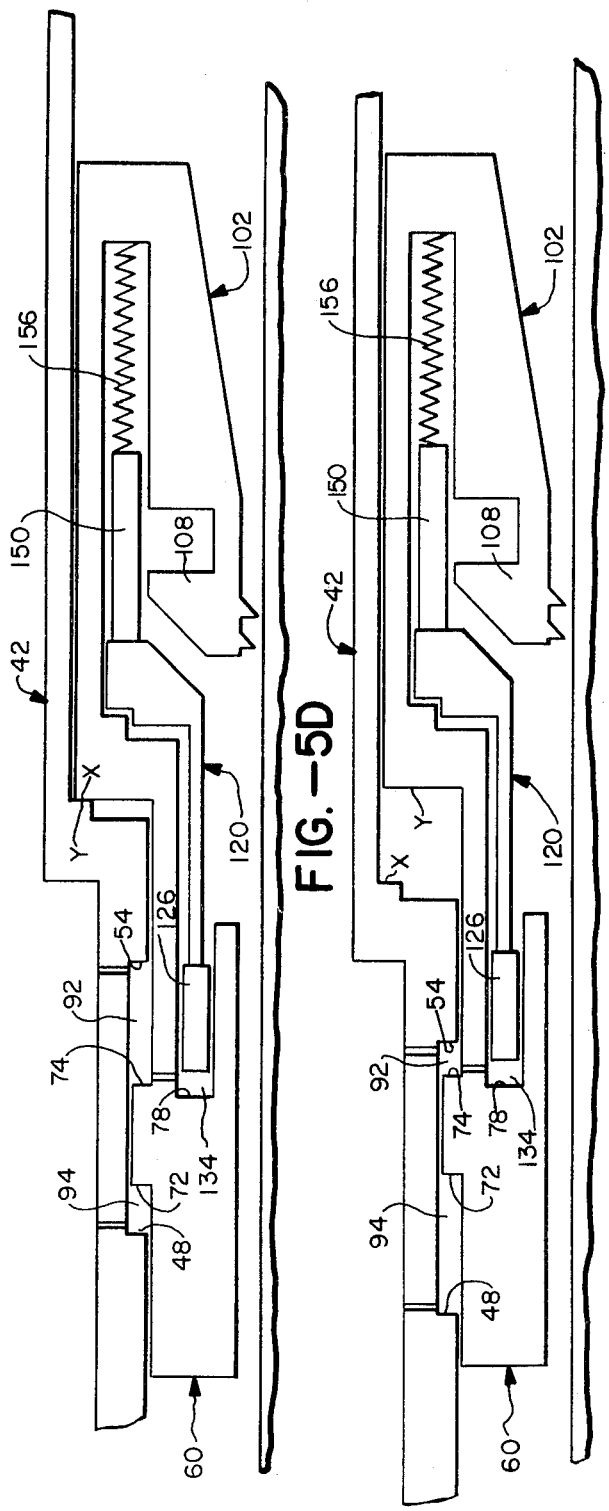
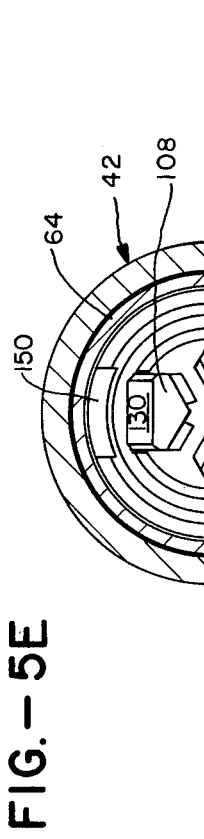
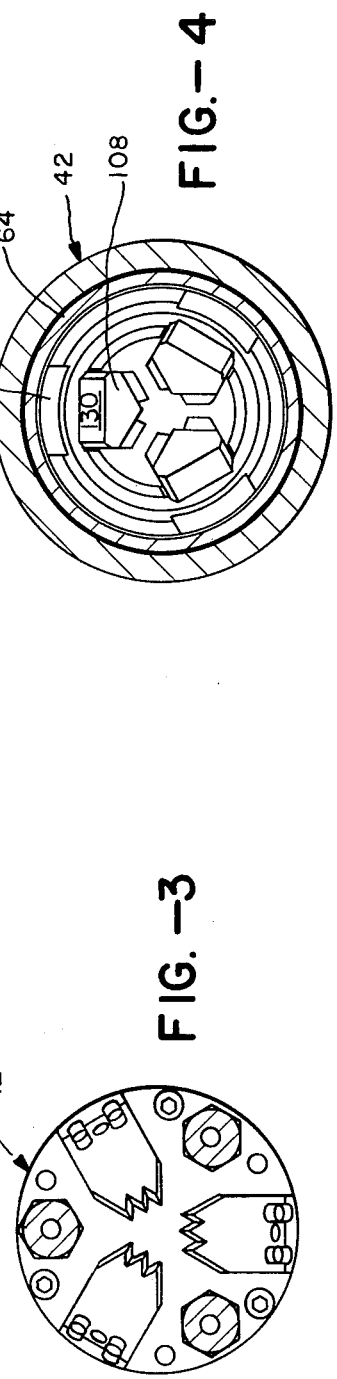

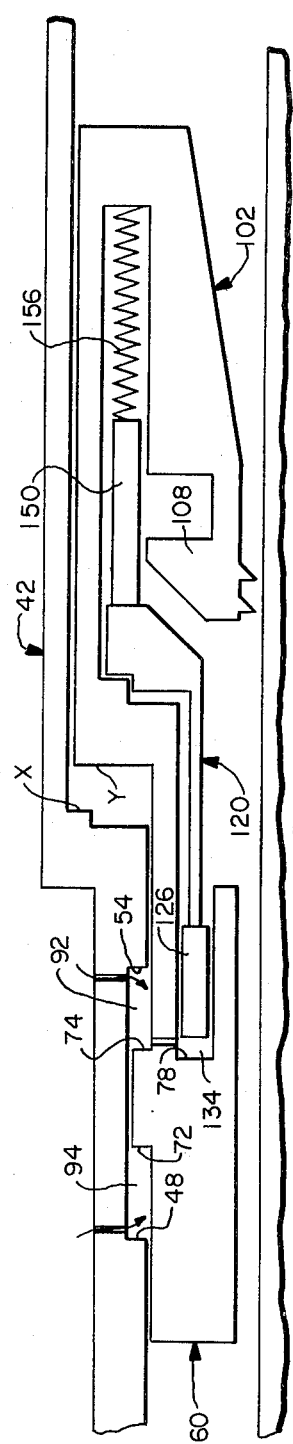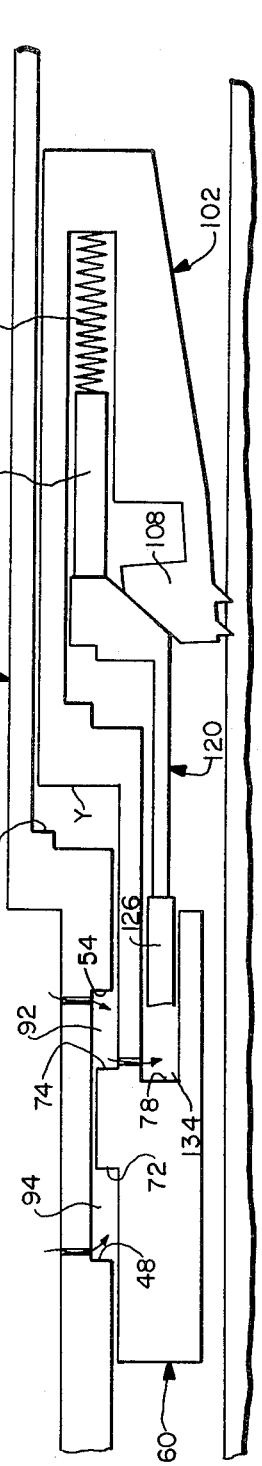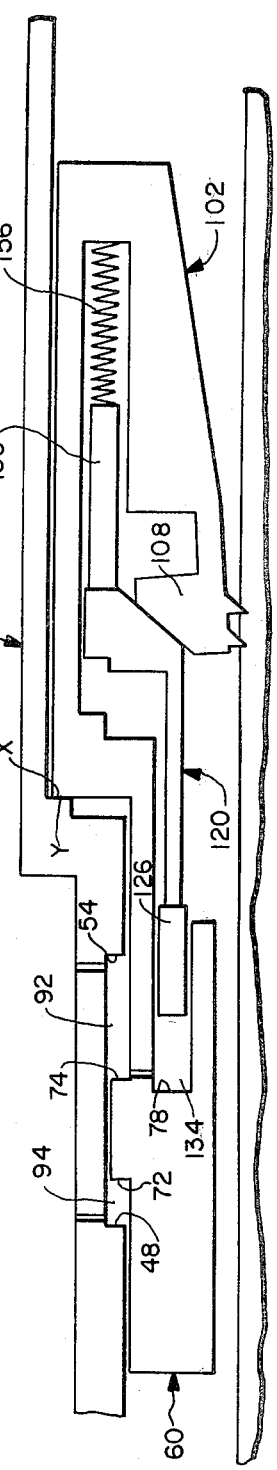

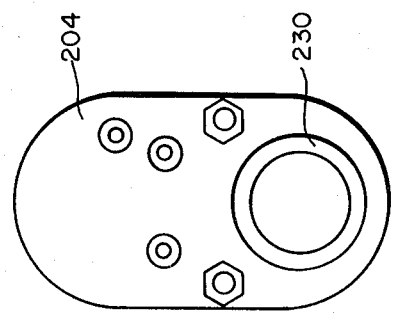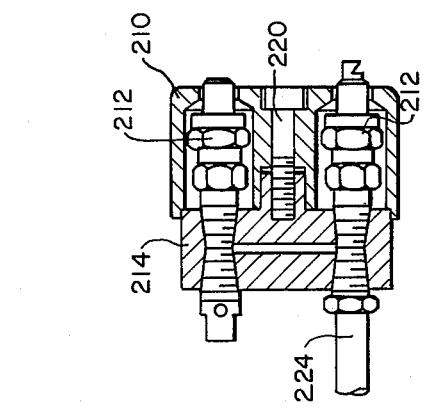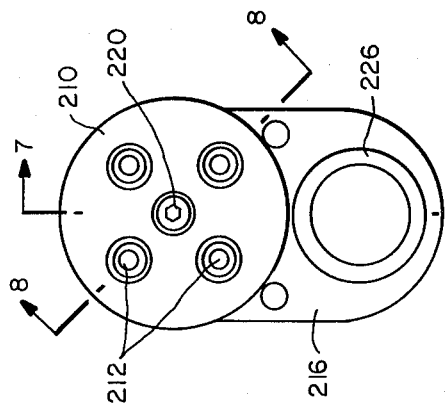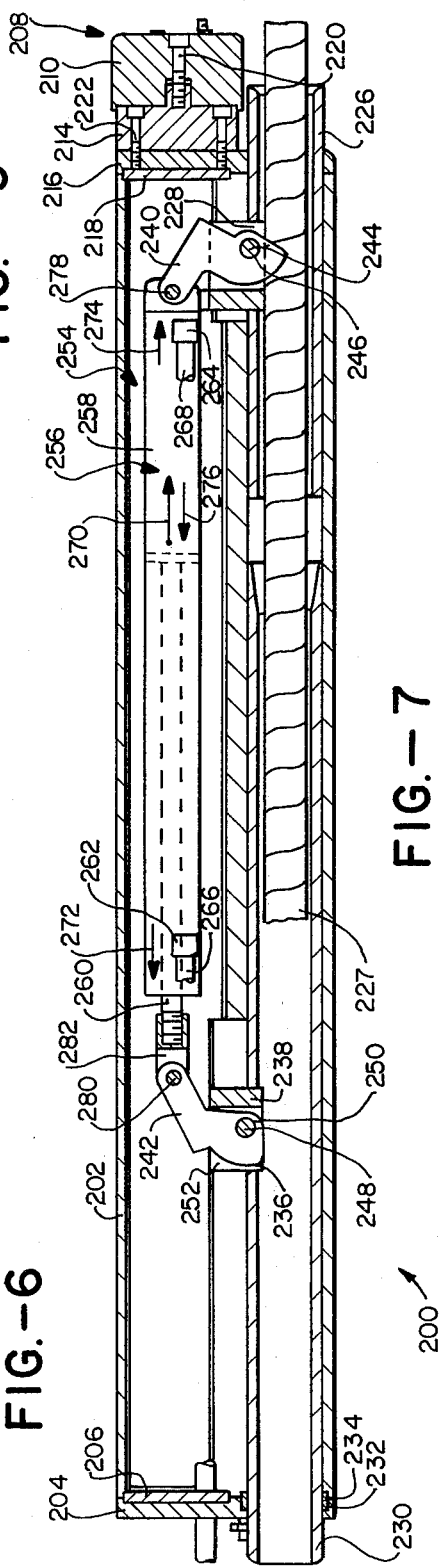

CABLE FOLLOWING APPARATUS UTILIZING A RELEASABLE CABLE GRIPPING MECHANISM

The present invention relates generally to a cable following apparatus such as the one described in copending U.S. patent application Ser. No. 196,847, filed Oct. 14, 1980 (Reichman, et al.), hich has been assigned to assignee of the present application and more particularly to specific improvements in this apparatus.

The apparatus described in the Reichman et al. patent application recited above is one which includes a tubular main body having inner and outer segments or sleeves interconnected for limited slidable movement relative to one another. This tubular body is disposed around the cable to be followed, concentrically or otherwise, such that alternating sliding movement of the body segments in the forward direction causes the overall body to slide forward along the cable. In order to accomplish this, the inner and outer segments include forward and rearward gripping mechanisms, respectively, continuously engaging the cables in a way which allows the tubular segments to slide in the forward direction only. While this presents no significant problem for the outer sliding segment and its associated rearward gripping mechanism, continuous engagement against the cable by the forward gripping mechanism associated with the inner tubular segment does result in a problem. More specifically, it has been found that when this latter gripping mechanism is maintained in continuous engagement with the cable during movement of the inner tubular segment, it tends to wear tracks in the cable. These tracks in turn can prevent the forward gripping mechanism from functioning in its intended way, that is, to prevent the inner tubular segment from sliding along the cable in the rearward direction. If this occurs, the overall main body will merely oscillate back and forth on a section of the cable including the tracks rather than sliding forward in the manner described in the above recited Reichman et al application.

Another problem which has been found to occur when utilizing the continuously engaging cable gripping mechanism associated with the inner tubular segment in the apparatus described above occurs when the cable itself is one which includes external rings. In this case, as the inner tubular sleeve slides forward, its gripping mechanism tends to pull the cable rings together causing the latter to bunch up. Since this cable mechanism is located within and near the front of the overall apparatus body, the buildup of cable rings tends to inhibit forward movement of the main body. While the gripping mechanism associated with the outer sliding sleeve also has the tendency to cause the cable rings to build up, this latter gripping mechanism is disposed behind the apparatus body and hence does not inhibit forward movement of the main body by such a buildup.

SUMMARY OF THE INVENTION

In view of the foregoing, it is one object of the present invention to provide a cable following apparatus of the general type described in the above recited Reichman et al. patent application but one which does not result in the problems described above.

A more specific object of the present invention it to overcome these problems by providing a cable following apparatus with a cable gripping mechanism which is capable of releasably engaging an associated cable in a controlled fashion.

Still a more specific object of the present invention is to provide a cable following apparatus of the particular type described in the Reichman et al. patent application recited above, but one which utilizes a forwardmost gripping mechanism movable between a cable gripping position and a non-gripping position in appropriate synchronism with its associated segment or sleeve for eliminating the previously described problems associated with a continuously engaging cable gripping mechanism.

Yet a more specific object of the present invention is to provide a cable following apparatus having both a forward and rearward gripping mechanism of the type just recited.

As will be described in more detail hereinafter, the overall cable following apparatus disclosed herein is one which includes a main body having first and second segments, preferably cylindrical sleeves, interconnected for limited slidable movement relative to one another. The main body is supported to a given cable such that alternating sliding movement of the two segments in the forward direction causes the main body to slide forward along the cable. The means for supporting the main body includes cable gripping means connected with the first sliding segment and movable between a first position in engagement with the cable for preventing the first segment from sliding along the cable and a second position out of engagement with the cable. The overall apparatus also includes means for causing the first and second body segments to slide alternately in the forward direction and means cooperating with this last-mentioned means for maintaining the gripping means in its cable engaging first position during sliding movement of the second body segment and in its second position out of engagement with the cable during sliding movement of the first segment. In one embodiment of the overall apparatus, only one of the sliding segments includes a movable cable gripping means, e.g., the first segment as recited. In a second, preferred embodiment, each segment includes such means.

The cable following apparatus disclosed herein will be described in more detail hereinafter in conjunction with the drawings wherein:

FIG. 1 is a diagrammatic illustration in perspective view of an overall system for replacing underground cable and particularly illustrating how the cable is replaced utilizing a cable following apparatus designed in accordance with a first embodiment of the present invention;

FIG. 2 is a longitudinal sectional view of a portion of the cable following apparatus illustrated in FIG. 1;

FIG. 3 is a cross-sectional view of the apparatus illustrated in FIG. 2, taken generally along line 3—3 in FIG. 2;

FIG. 4 is a cross-sectional view of the apparatus illustrated in FIG. 2, taken generally along line 4—4 in FIG. 2;

FIGS. 5A-5E diagrammatically illustrate the way in which the apparatus of FIG. 2 operates in order to slidably move along an associated cable;

FIG. 6 is a front end view of a cable following apparatus which is designed in accordance with a second, preferred embodiment of the present invention but which is equally appropriate in the overall system of FIG. 1;

FIG. 7 is a longitudinal sectional view of the apparatus of FIG. 6 taken generally along line 7—7 in FIG. 6;

FIG. 8 is a sectional view of a portion of the apparatus of FIG. 6 taken along line 8—8 in FIG. 6; and FIG. 9 is a back end view of the apparatus of FIG. 6.

Turning now to the drawings, wherein like components are designated by like reference numerals throughout the various figures, attention is first directed to FIG. 1 which diagrammatically illustrate two spaced transformer stations generally indicated at 10 and 12 and an underground cable 14 extending therebetween. FIG. 1 also diagrammatically illustrates an apparatus generally indicated at 16 for reaming or otherwise loosening the soil around and along the length of cable 14 for making it relatively easy to pull out and replace the latter with a new cable 18. In order to accomplish this, overall apparatus 16 includes a main body or cable follower 20 which is interconnected with and slides along cable 14 from transformer station 10 to transformer station 12. The cable follower carries with it means for reaming or otherwise loosening the soil around and along the length of the underground cable. Once the cable follower reaches station 12 from station 10, cable 14 can be readily pulled out of the ground from one end, for example from station 12, utilizing a suitable device such as a power winch. At the same time, one end of replacement cable 18 can be fastened to the other end of the cable, for example at station 10, as indicated generally at 22. In this way, as cable 14 is pulled out of the ground, cable 18 is pulled into the ground in its place.

In a preferred and actual working embodiment of the present invention, apparatus 16 utilized liquid, preferably water, under pressure to loosen the soil around and along the length of cable 14 and hydraulic action to move the cable follower. By utilizing water or other suitable liquid jets to ream around and along the length of the cable, the liquid combines with the loosened soil to form a slurry which surrounds the cable. This helps to maintain the cable in a relatively loose position underground and serves to prevent the ground above the cable from collapsing before the cable can be removed. In this regard, it should be pointed out that the soil initially surrounding the cable is usually relatively free of rocks since the cable as originally installed was most likely placed in an open trench backfilled with soil. This, of course, makes it easier to ream around the cable by means of water jets or the like. Both the water under pressure and the hydraulic fluid, preferably oil, can be portably brought to station 10. As illustrated in FIG. 1, overall apparatus 16 includes a source of high pressure water, that is, a water tank generally indicated at 24 and an electrically powered water pump 26 for providing water jets for reaming around the soil. The apparatus also includes a hydraulic pump 28 along with a supply of hydraulic fluid 30 and suitable control valves generally indicated at 32 in FIG. 1, all of which are provided for powering the cable follower. All of these components, that is, the source of high pressure water and the hydraulic components can be carried to the site on a truck 34.

With the exception of cable follower 20 and the specific way in which the cable follower is controlled to slide along cable 14, the overall apparatus 16 and the intended way in which it is used may be identical in structure and function to the overall apparatus described in the previously recited Reichman et al patent application. Moreover, as will be pointed out hereinafter, the cable follower 20 disclosed herein is similar or may be identical in most respects to the cable follower described in the Reichman et al. patent application. The primary differences between the two reside in the utilization of an improved cable gripping arrangement comprising part of the present cable follower, as indicated above. While this particular arrangement will be described in detail hereinafter, the other components of apparatus 16 including those comprising part of cable follower 20 will be only briefly discussed unless more detailed discussions are necessary to an understanding of the improved cable gripping arrangement. For a more detailed description of those components only briefly discussed herein reference is specifically made to the Reichman et al. patent application which is incorporated herein by reference.

Turning now to FIGS. 2-4, attention is specifically directed to cable follower 20 and the way the latter operates to slidably move along and ream around cable 14. To this end, the cable follower can be separated into three functional components, (i) a main body or drive mechanism 36 which responds to external hydraulic forces to move along cable 14, (ii) rearward and forward gripping arrangements 38 and 39 for interconnecting the main body or drive mechanism to the cable such that the entire cable follower slidably moves along the length of the cable in a forward direction from one end of the latter to its other end, and (iii) means 40 in the form of a nozzle bearing front end cap arrangement for receiving a supply of high pressure water or other suitable liquid and for converting the latter to a number of high pressure fluid jets so as to ream or otherwise loosen the soil surrounding the cable.

As seen in FIG. 2 in conjunction with FIGS. 3 and 4, main body 36 of cable follower 20 takes the form of an open ended cylinder which with the aid of arrangements 38 and 39 to be discussed below is concentrically positioned around cable 14. Main body 36 includes an outer sleeve 42 including a rearward section 44 and a diametrically larger forward section 46. The rearward section includes an outer tubular segment 44a and a shorter segment 44b concentrically positioned against the inner surface of outer segment 44a a predetermined distance inwardly from the forwardmost end of the latter. In this way, the inner segment defines a radially inwardly directed and forwardly facing annular shoulder 48. The two segments 44a and 44b are interconnected in any suitable manner, for example by means of circumferentially spaced roll pins, two of which are indicated at 50. The two sections of outer sleeve 36, that is sections 44 and 46, are interconnected by an adapter barrow 52 which extends partially into the front end of segment 44a to provide a radially inwardly extending and rearwardly facing annular shoulder 54. At the same time, the barrel extends slightly into the rearward end of sleeve section 46. The adapter barrel is fixedly connected in any suitable way with the two sleeve sections. The overall outer sleeve constructed in this manner includes an innermost series of internal surfaces 56, the previously recited annular shoulders 48, 54 and an outermost internal surface 58.

Main body 36 of overall cable follower 20 not only includes outer sleeve 42 but also an inner sleeve 60 disposed concentrically within the outer sleeve. As will be seen hereinafter, the two sleeves are interconnected for limited slidable movement relative to one another. Referring to FIG. 2, the inner sleeve is shown including a rearward section 62 and a diametrically larger forward section 64 interconnected to the front end of rearward section 62 by any suitable means such as circumferentially spaced roll pins, one of which is indicated at 66 in FIG. 2. The rearward section 62 of inner sleeve 60 includes concentric segments 62a and 62b which are attached to one another at their back ends by suitable means such as circumferentially spaced roll pins, one of which is indicated at 68. Segment 62a includes a radially outwardly extending, intermediate segment 70 which defines a radially outwardly extending, rearwardly facing annular shoulder 72 disposed in confronting relationship with previously recited shoulder 48 and a radially outwardly extending forwardly facing annular shoulder 74 disposed in confronting relationship with the previously recited shoulder 54. Segment 62b also includes a radially outwardly extending, intermediate portion 76 which defines a radially outwardly extending forwardly facing annular shoulder 78. The portion of section 62b located in front of shoulder 78 together with shoulder 78 and the portion of segment 62a in front of shoulder 74 define an annular opening 80 which is provided for reasons to be discussed hereinafter. The overall inner sleeve 60 includes an innermost inner surface 82, an outermost inner surface 84 and an intermediate inner surface 86. The inner sleeve also includes a series of innermost outer surfaces 86, the previously recited annular shoulder 72, 74 and annular opening 80 as well as an outermost outer surface 90.

The two sleeves together, that is, outer sleeve 42 and inner sleeve 60, define annular spaces 92 and 94 which, as will be seen hereinafter, respectively correspond in function to the spaces 62 and 60 in the cable follower disclosed in the above recited Reichman et al. patent application. More specifically, the annular spaces 92, 94 are adapted to receive hydraulic fluid under pressure in a sequential, controlled manner for causing the overall tubular body 36 to move in a forward direction. To this end, the outer sleeve 42 includes a series of passageways connecting the annular spaces to the remote supply 30 of hydraulic fluid described with respect to FIG. 1. For a detailed discussion of these passages and the way they interconnect the annular spaces to the hydraulic fluid supply, reference is made to the previously recited Reichman et al patent application. For reasons to be discussed hereinafter, the annular opening 80 is maintained in fluid communication with the annular space 92 by means of a series of circumferentially spaced ports 100.

Before turning to the cable gripping arrangements 38 and 39, attention is briefly directed to means 40 which, as stated previously, serves as a nozzle bearing front end cap arrangement for receiving a supply of high pressure water or other suitable liquid so as to convert the latter to a number of high pressure fluid jets for reaming or otherwise loosening the soil around the cable. Since this particular arrangement could be identical to its counterpart in the previously recited Reichman et al. patent application and since it does not per se form part of the present invention, it will not be described any further herein. Rather, reference is made to the Reichman et al. patent application.

Turning specifically to FIG. 3 in conjunction with FIG. 2, attention is directed to cable gripping arrangement 38. This arrangement may be identical to the cable gripping arrangement 106 in the Reichman et al. patent application and hence will not be described in detail herein. It suffices to say that this arrangement is connected with and at the rearward end of outer sleeve 42 for continuously engaging cable 14 in a way which allows the outer sleeve to slide along the cable in the forward direction only.

Referring now to FIG. 4 in conjunction with FIG. 2, attention is directed to cable gripping arrangement 39 which is designed in accordance with the present invention and which is provided for engaging and disengaging cable 14 in a controlled fashion to be described below. Arrangement 39 includes three gripping members disposed within and equally circumferentially spaced around the forwardmost section 64 of inner sleeve 60. One of these gripping members is illustrated in FIG. 2 at 102. Gripping member 102 includes an elongated arm 104 which extends generally parallel with sleeve section 64 and which is connected at its forwardmost end with the forwardmost end of section 64 by suitable means such as roll pin 106. Arm 104 is spaced radially inwardly from the inner surface 84 of sleeve section 64 to define an axially extending channel 106 therebetween. At the same time, arm 104 is somewhat flexible so that its rearwardmost, otherwise free end is radially movable with respect to surface 84. Gripping member 102 also includes a gripper 108 connected by suitable means such as roll pin 110 and flat head screws 112 to the otherwise free rearward end of arm 104. As seen in FIG. 2, this gripper includes radially inwardly extending teeth 114 and, for reasons to be discussed below, an outwardly extending, inclined cam surface 116.

The gripping member just described is one of three such members forming part of overall gripping arrangement 39, as stated above. The other two gripping members may be identical to this gripping member and therefore include their own grippers 108 illustrated in FIG. 4. Each of the grippers is supported by its associated arm for movement between the cable gripping position illustrated in FIG. 4 which is a forced position and a biased, radially outward position out of engagement with the cable. In order to maintain the grippers in their cable engaging positions, overall arrangement 39 includes a control mechanism which is illustrated in FIG. 2 at 118.

Mechanism 118 includes a drive member or actuator 120 having an elongated tubular main section 122, an enlarged head 124 fixedly connected to the front end of main section 122 and an enlarged annular piston 126 forming the back end of main section 122. Enlarged head 124 includes a radially outermost surface 128 in slidable engagement with surface 84 and an inner, inclined surface 130 which is designed complementary to previously recited surface 116. Piston 126 is designed to slidably move within previously described opening 80 and includes suitable sealing means generally indicated at 132 for providing a seal around the piston. At the same time, the piston serves to close opening 80 whereby the latter becomes an annular space similar to spaces 92 and 94.

It should be apparent from the foregoing, that actuator 120 is movable between the position illustrated in FIG. 2 and an axially rearward position in which annular space 134 is smaller. With actuator 120 in the position illustrated, the surface 130 of enlarged head 124 rests against complementary surface 116 of gripper 108 for maintaining the latter in its cable gripping position. With actuator 120 in its rearward position, the enlarged head 124 is disposed axially rearward of gripper 108 a sufficient distance to allow the latter to move by its own force back to its biased non-gripping position. The actuator acts on the other gripping members in the same way.

As will be seen hereinafter, actuator 120 is maintained in the position illustrated in FIG. 2 by means of hydraulic pressure caused by filling the annular space 134. However, in order to maintain the actuator to its retracted position, overall gripping arrangement 39 includes a plurality of push rods 150 disposed within space 106 in parallel relationship with and equally circumferentially around the inner surface 84 of inner sleeve section 64. Each of these push rods is mounted within space 106 for axial slidable movement. To this end, each includes a guide pin 152 interconnecting it to inner sleeve section 64 along a cooperating longitudinally extending slot 154. A bellville spring 156 is also disposed within space 106 between the push rods 150 and the forwardmost end of the space. The spring serves to bias the push rods in extended positions forwardly of the retracted positions illustrated in FIG. 2. This causes the actuator 120 to be biased in its retracted position. On the other hand, when the actuators are forced to their extended position by hydraulic force, this causes the push rods to move to their retracted positions (FIG. 2) which, in turn, causes the bellville spring 156 to be compressed. Obviously, for this type of relative movement to occur, the hydraulic force exerted on the actuators must be greater than the spring force exerted by bellville spring 156.

Having described the pertinent structural details of cable follower 20, attention is now directed to the way in which the cable follower is caused to slide along cable 14 in the forward direction. For this discussion, reference is made to FIGS. 5A–5E which illustrate the overall cable follower in a diagrammatic fashion, that is, without showing unnecessary details.

Turning first to FIG. 5A, the overall cable follower is illustrated in an initial position in which the actuator 120 is in its retracted position and hence the grippers 108 are in their positions out of engagement with cable 14. With the cable follower in this condition, the first step is to direct hydraulic fluid into both of the spaces 92 and 94 simultaneously. As fluid enters and fills space 92, it passes into space 134 through ports 100, as illustrated in FIG. 5A, This, in turn, causes the piston end of actuator 120 to move from its retracted position in FIG. 5A to its extended position in FIG. 5B. Movement of the actuator to its extended position causes the push rods 150 to move against spring 156 to their forwardmost, retracted positions. At the same time, the surface 130 forming part of actuator head 124 engages against and rides on complementary cam surfaces 116 forming part of grippers 108 causing the latter to move from their non-gripping positions illustrated in FIG. 5A to their gripping positions in FIG. 5B. This prevents the inner sleeve 60 from sliding either forward or backwards on cable 14. However, the outer sleeve 42 which is prevented from sliding rearwardly by cable gripping arrangement 38 is free to slide forward. As a result, the hydraulic fluid within space 92 develops a forwardly directed force against the annular shoulder 54 forming part of the outer sleeve and causing the latter to slide forward from its position illustrated in FIG. 5B to the position illustrated in FIG. 5C, that is, until the shoulder 157 forming part of the outer sleeve bears against the shoulder 159 forming part of the inner sleeve. At the same time, the annular space 94 is caused to closed or at least decrease in size, thereby forcing any hydraulic fluid therein back to its source.

After the outer sleeve 42 has moved forward an increment in the manner described, the spaces 92 and 134 are relieved of hydraulic pressure. This, in turn, allows the spring 156 and its associated push rods 150 to force actuator 120 back to its retracted position illustrated in FIG. 5D causing the fluid in space 134 to move back into space 92 (with some fluid being forced back to its source). This, in turn, allows the grippers 108 to move to their non-gripping position. After this has occurred, the space 94 is filled with hydraulic fluid resulting in hydraulic forces being applied to shoulders 48 and 72. Since the outer sleeve cannot move rearwardly, these forces cause the inner sleeve to move forward an increment to the position illustrated in FIG. 5E. In this regard, it should be noted that the entire cable gripping arrangement 39 moves with the inner sleeve without engaging the cable. As the inner sleeve moves forward, the space 92 is closed causing any fluid therein to be forced back to its source.

The foregoing has been a description of how the outer sleeve and inner sleeve each moves an increment in the forward direction. This procedure is repeated in order to move the overall cable follower along cable 14. The precise way in which the hydraulic fluid is applied alternatively into the annular spaces may be the same as in the Reichman et al. patent application or, in any event, it could be readily provided in view of the teachings in that application. In this regard, FIG. 2 includes a diagrammatic illustration of the controls for accomplishing this. These controls do differ slightly from those in the Reichman et al. patent application. One difference worth noting resides in the utilization of a time delay between the time pressure is released from spaces 92, 134 and the time hydraulic fluid is applied to space 94. This time delay (approximately ten seconds) is provided to allow the grippers to move from their cable engaging positions to their non-engaging positions.

Having described cable follower 20 both structurally and operationally, attention is directed to a modified cable follower 200 which is designed in accordance with a second, preferred embodiment of the present invention and which is illustrated in FIGS. 6–9. As will be seen below, cable follower 200 serves the same purpose as cable follower 20 in overall system 10 and can be readily substituted for the previously described cable follower in this system. As will also be seen, the cable follower 200 is significantly less complicated from a mechanical standpoint than cable follower 20 and, at the same time, it utilizes two cable engaging and disengaging mechanisms rather than just one as in the cable follower 20. In this way, there is never a cable gripping mechanism in sliding engagement with an associated cable as the overall cable follower slides along the latter.

Referring now to FIGS. 6–9, and specifically FIG. 7, cable follower 200 is shown including an outermost support tube or body segment 202 which is closed at its back end by means of a rear flange 204 and associated pilot spacer 206. The front end of support tube 202 carries a nozzle bearing front end cap arrangement generally indicated at 208 which is similar in function to means 40 forming part of the cable follower 20. Arrangement 208 is shown best in FIGS. 7 and 8 including a forwardmost nozzle guard 210 containing a plurality of spray nozzles 212, some of which may be of the deflected type such as the bottom one illustrated in FIG. 8. Arrangement 208 also includes a manifold 214 connecting nozzle guard 210 to a front flange 216 and associated front pilot spacer 218 which close the front end of support tube 202. Suitable cap screws 220 and 222 are utilized to connect these various components making up arrangement 208 together. As stated above, this overall nozzle bearing front end cap arrangement serves the same purpose as means 40 in cable follower 20 and the corresponding means in the previously recited copending Reichman et al patent application. Thus, a suitable arrangement of conduit generally indicated at 24 serves to carry the source of fluid spray, e.g., water, to the nozzles from an appropriate source, for example one on truck 34 shown in FIG. 1.

As best seen in FIG. 7, a front cable guiding tube 226 is disposed partially within tube 202 and partially outside the front end of the latter in a fixed position relative to and connected with front flange 216, around a cable 227. For reasons to be discussed below, the cable guiding tube 226 is disposed at the bottom end of tube 202 and includes an opening 228 in its top sidewall slightly inward of the front end of tube 202.

A second cable guide tube 230 is also disposed within outermost support tube 202 in axial alignment with and directly rearwardly of tube 226, but also around cable 227. However, tube 230 is supported within tube 202 for axial slidable movement into and out of tube 202 through the back end of the latter, that is, towards and away from the back end of tube 226. In order to provide this relative movement of tube 230 relative to the tubes 202 and 226, rear flange 204 is provided with an appropriately sized opening 232 and a guide bushing 234 is provided around the opening in slidable engagement with the outer surface of tube 230. Otherwise, the tube slides on the inner bottom side of tube 202. For reasons to be discussed below, the slidable tube 230 includes an opening 236 in its top sidewall at an intermediate point along its length, and a flange 238 is connected with and extends up from the sidewall just in front of this opening.

In addition to the various components thus far described, cable follower 200 includes a first forwardmost cable gripping device 240 and a second or rearwardmost cable gripping device 242. The cable gripping device 240 is somewhat L-shaped in configuration as shown in FIG. 7 and is mounted within outermost tube 202 for pivotal movement about an axis 244 between the cable engaging position shown in FIG. 7 through opening 228 and a position out of engagement with the cable 227. A pivot pin 246 or any other suitable means may be utilized for supporting the cable gripping device 240 in this manner so long as the latter is slidably movable with outermost tube 202 and guide tube 226 in the manner to be described. The guide pin can be connected directly with the inner walls of tube 202 or suitable support plates (not shown) may be provided. The rearwardmost cable gripping device 242 is similarly shaped and connected with sliding tube 230 while, at the same time, being pivotally mounted for movement between a position out of engagement with the cable 227 and a cable engaging position about axis 248 and into opening 236. To this end, a pivot pin 250 or other suitable means is provided for supporting the cable gripping device 240 for its pivotal movement. The pivot pin and device are supported by means of opposing support plates 252, only one of which is shown.

From a functional standpoint, outermost tube 202 and cable guiding tube 226 together correspond to one of the sleeves making up cable follower 20, for example, outer sleeve 42. Sliding tube 230 corresponds to the other sleeve, specifically, inner sleeve 60 and one of the two cable gripping devices 240, 242 corresponds to the gripping member 102 forming part of the cable follower 20. The other cable gripping device forming part of cable follower 200 corresponds to the cable gripping arrangement 38 in follower 20, but is capable of gripping and releasing its associated cable whereas the arrangement 38 does not have this capability, as discussed previously. As will be seen below, overall cable follower 200 includes an arrangement generally indicated at 254 for causing the outermost tube 202 and its associated cable guiding tube 226 to slide forward along and relatively to the cable in incremental steps in an alternating manner with tube 230. Moreover, as discussed previously, this is accomplished such that neither of the cable gripping devices 240 or 242 engages the cable during forward movement of its associated tube.

Referring specifically to FIG. 7, arrangement 254 is shown including a hydraulic cylinder arrangement 256 disposed within outer tube 202. The hydraulic cylinder arrangement includes an outer cylinder 258 and a piston 260 telescopically movable between an extended position and a retracted position within the back end of the cylinder. To this end, two ports, a rear port 262 and a front port 264 are provided in cylinder 258. The rear port is adapted to receive fluid under pressure from an appropriate source, e.g., a source at truck 34 (see FIG. 1) and the front port is adapted to receive fluid under pressure in the same manner. As illustrated in FIG. 7, the conduits 266 and 268 are provided for this purpose. For reasons to be discussed below, when hydraulic fluid is applied into cylinder 258 through its rearward port 262, the piston 260 is caused to move forward relative to the cylinder, as indicated by arrow 270 and, at the same time, the cylinder is forced rearward relative to the piston, as indicated by arrow 272. This presupposes that the port 26 remains open to an ambient pressure (or relieved of pressure generally) as fluid is directed into port 262. This procedure is reversed by opening the port 266 to ambient pressure and, at the same time, applying hydraulic fluid into the cylinder through port 264. This causes the cylinder to move forward as indicated by arrow 274 while the piston is pushed in a rearward direction as indicated by arrow 276. The way in which this alternating movement of the piston and cylinder causes the overall apparatus to slide forward along the cable in incremental steps will be discussed below. However, in order to make this happen, the front end of the cylinder is pivotally connected to cable gripping device 240 by suitable pivot means 278 such that movement of the cylinder between a rearward position and a forward position relative to previously recited axis 244 causes the entire gripping device 240 to move between its locked position shown and are unlocked position. In a similar manner, the rearwardmost end of the piston 260 is pivotally connected to cable gripping device 242 by suitable pivot means generally indicated at 280. A rod clevis 282 is utilized to make this connection. The connection between piston 260 and cable gripping device 242 is such that forward and rearward movement of the piston relative to previously recited axis 248 causes the cable gripping device to move between its position out of engagement with the cable as shown and a cable gripping position.

Having described overall apparatus 200, and the various components making up this apparatus, both structurally and functionally, attention is now directed to the way in which the apparatus moves in incremental steps along the cable from one end of the latter to its other end. To this end, let it be assumed that the cable gripping devices 240 and 242 are initially in the positions shown and that the port 268 is opened to ambient pressure while hydraulic fluid is being applied into the cylinder 258 through port 262. Under these conditions, the piston 260 is moving forward in the direction of arrow 270 and the cylinder is biased in the rearward direction of arrow 272. The rearward biasing of cylinder 258 causes cable gripping device 240 to lock tightly in gripping engagement with cable 227 locking tube 226 in place. At the same time, forward movement of the piston 260 causes the cable gripping device 242 to remain out of engagement with the cable. In addition, as the piston moves forward it pulls the cable gripping device and cable guiding tube 230 forward with it. This movement continues until the forwardmost end of tube 230 engages the rearwardmost end of tube 226. At the same time, the piston is designed to be fully drawn within the cylinder. Once this occurs, the port 262 opens to ambient pressure and the port 268 receives hydraulic fluid. This causes the piston to move rearwardly a slight distance, specifically enough to pivot its cable gripping device 242 into locking engagement with the cable. At the same time, the cylinder is moved forward relative to the locked-in piston which, in turn, causes the cable gripping device 240 to pivot out of engagement with the cable. Thus, the entire cylinder is able to continue in a forward direction, thereby forcing tube 202 and tube 226 forward an incremental step relative to the locked-in tube 230. This ultimately places the piston in an extended position relative to the cylinder and results in a correspondingly large space between the back end of tube 226 and the front end of tube 230.

The procedure just recited is continuously repeated. In other words, the piston is moved forward into the cylinder from its extended to its retracted position while cable gripping device 240 is in its cable gripping position and the cable gripping device 242 is out of engagement with the cable, thus, causing the tube 230 to move an incremental step forward relative to the cable. Thereafter, the cylinder 258 is caused to move forward while the cable gripping device 242 is in its cable gripping position and the cable gripping device 240 is out of engagement with the cable, thus causing the tubes 202 and 226 to move forward an incremental step. From this pattern, it should be apparent that no cable gripping device engages the cable 227 during movement of its associated guide tube. The means used to alternately apply fluid to the two ports can be the same means associated with follower 20.

What is claimed is:

1. An apparatus for moving along the length of an existing cable in a forward direction, comprising: a main body including first and second segments interconnected for limited slidable movement relative to one another; means for supporting said main body to said cable such that alternating sliding movement of said body segments in said forward direction causes said main body to slide forward along said cable, said supporting means including cable gripping means connected with said first body segment and movable between a first position in engagement with said cable for preventing said first segment from sliding along said cable and a second position out of engagement with said cable; means for causing said first and second body segments to slide alternately in the forward direction; and means cooperating with said last-mentioned means for maintaining said gripping means in its cable engaging first position during sliding movement of said second segment and in its second position out of engagement with said cable during sliding movement of said first segment.

2. An apparatus according to claim 1 wherein said supporting means includes means connected with said second body segment for engagement with said cable in a way which allows said second segment to slide in the forward direction only.

3. An apparatus according to claim 2 wherein said main body has an overall open ended, tubular configuration for positioning concentrically around said cable during its movement along the latter and wherein said first and second body segments are inner and outer concentric, tubular sections of said main body, respectively.

4. An apparatus according to claim 2 wherein said means for causing said segments to slide includes first means for applying hydraulic force to said main body to slidably move said first segment incremental steps in the forward direction relative to said cable and second segment and second means for applying hydraulic force to said main body to slidably move said second segment incremental steps in the forward direction relative to said cable and first segment.

5. An apparatus according to claim 1 wherein said supporting means includes cable gripping means connected with said second body segment and movable between a first position in engagement with said cable for preventing said second segment from sliding along said cable and a second position out of engagement with said cable means and wherein said cooperating means cooperates with said slide causing means for maintaining said last-mentioned gripping means in its cable engaging first position during sliding movement of said first segment and in its second position out of engagement with said cable during sliding movement of said second segment, whereby the first-mentioned and last-mentioned cable gripping means alternatively grip said cable during operation of said apparatus.

6. An apparatus for reaming around and along the length of an existing underground cable for replacing the latter, said apparatus comprising: a tubular main body including an inner tubular segment and an outer tubular segment disposed concentrically around said inner segment, said segments being interconnected for limited slidable movement relative to one another; means for supporting said main body concentrically around said cable such that alternating sliding movement of said body segments in said forward direction causes said main body to slide forward along said cable, said supporting means including first gripping means connected with said outer tubular segment for engaging said cable in a way which allows said outer segment to slide along said cable in a forward direction only and second gripping means connected with said inner segment and movable between a gripping position in engagement with said cable for preventing said inner segment from sliding along said cable and a non-gripping position out of engagement with said cable; drive means for causing said inner and outer segments to slide alternately in the forward direction; and grip control means cooperating with said drive means for maintaining said second gripping means in its cable gripping position during sliding movement of said outer segment and in its non-gripping position during sliding movement of said inner segment.

7. An apparatus according to claim 6 wherein said second gripping means includes a plurality of gripping members circumferentially spaced around and located within the inner periphery of said inner tubular segment and movable therewith, each of said gripping members including an elongated support arm connected at one end to and extending generally parallel with said inner tubular segment and a cable engaging gripper connected to the otherwise free end of said support arm, each of said support arms being movable in a flexing fashion between a biased forced position and a forced second position for moving its gripper between said non-gripping position and gripping position, respectively.

8. An apparatus according to claim 7 wherein said grip control means includes means supported by said inner tubular segment for movement between a first biased position out of engagement with said gripping members whereby to allow the latter to remain in their non-gripping positions and a second forced position in engagement with said gripping members for maintaining the latter in their cable gripping positions.

9. An apparatus according to claim 8 wherein said drive means includes first means for applying hydraulic force to said main body and said grip control means for maintaining said second gripping means in its cable gripping position whereby to prevent said inner tubular segment from sliding and for simultaneously slidably moving said outer segment and second means for applying hydraulic fluid to said main body to slidably move said inner tubular segment when said second gripping means is in its non-gripping position.

10. An apparatus according to claim 9 wherein said first gripping means is always in a position for engaging said cable during operation of said apparatus.

11. An apparatus for moving along the length of an existing cable in a forward direction, comprising: a main body including first and second segments interconnected for limited slidable movement relative to one another; means for supporting said main body to said cable such that alternating slidable movement of said body segments in said forward direction causes said main body to slide forward along said cable, said supporting means including first cable gripping means connected with said first body segment and movable between a first position in engagement with said cable for preventing said first segment from sliding along said cable and a second position out of engagement with said cable and second cable gripping means connected with said second body segment and movable between a first position in engagement with said cable for preventing said second segment from sliding along said cable and a second position out of engagement with said cable; and means for causing said first and second body segments to slide alternately in the forward direction, said slide causing means including means for maintaining said first gripping means in its cable engaging first position during sliding movement of said second segment and in its second position out of engagement with said cable during sliding movement of said first segment and, at the same time, for maintaining said second gripping means in its cable engaging first position during sliding movement of said first segment and its second position out of engagement with said cable during said sliding movement of said second segment.

12. An apparatus according to claim 11 wherein said slide causing means includes: a piston-cylinder mechanism including an outer cylinder and a piston disposed within said cylinder for movement between an extended position and a retracted position relative to said cylinder whereby to cause the overall mechanism to expand and contract in length; means for causing said piston-cylinder mechanism to expand and contract in length in a controlled alternating fashion; and first and second means for respectively connecting said cylinder to said first cable gripping means and said piston to said second cable gripping means such that during the expansion of said piston-cylinder mechanism, said first body section is caused to slide forward relative to said cable while said second cable gripping means is maintained in its cable gripping position so as to prevent said second body segment from moving relative to said cable and such that contraction of said piston-cylinder mechanism causes said second body segment to slide forward relative to said cable while said first gripping means is maintained in the cable gripping position so as to prevent said first body segment from moving relative to said cable.

13. An apparatus according to claim 12 wherein said first cable gripping means is pivotally connected at one point to said first body segment and at a second point to said cylinder and wherein said second cable gripping means is connected at one point to said second body segment and at a second point to said piston such that the initial expansion of said piston-cylinder mechanism from its contracted position simultaneously causes said first cable gripping means to pivotally move from its cable gripping position to a position out of engagement with said cable and said second cable gripping means to pivotally move from its position out of engagement with said cable to its cable gripping position and such that contraction of said piston-cylinder mechanism from its expanded position simultaneously causes said first gripping means to pivotally move from its position out of engagement with said cable to its cable engaging position and said second cable gripping means to pivotally move from its cable gripping position to a position out of engagement with said cable.

* * * * *